March 1, 1938.  G. A. LYON  2,109,671
HUB CAP FOR WHEELS
Filed July 30, 1935   2 Sheets-Sheet 1
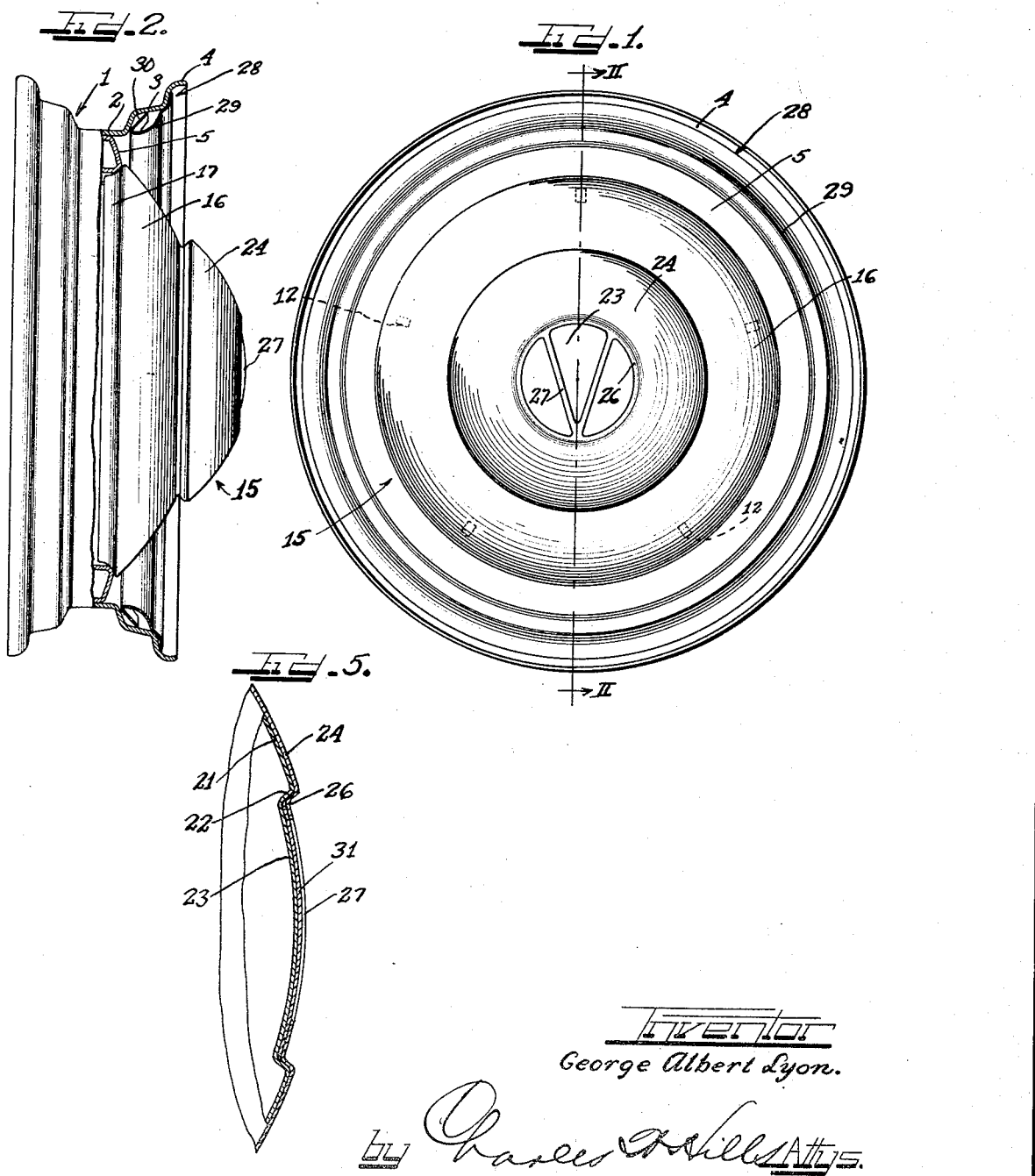

March 1, 1938.  G. A. LYON  2,109,671
HUB CAP FOR WHEELS
Filed July 30, 1935  2 Sheets-Sheet 2
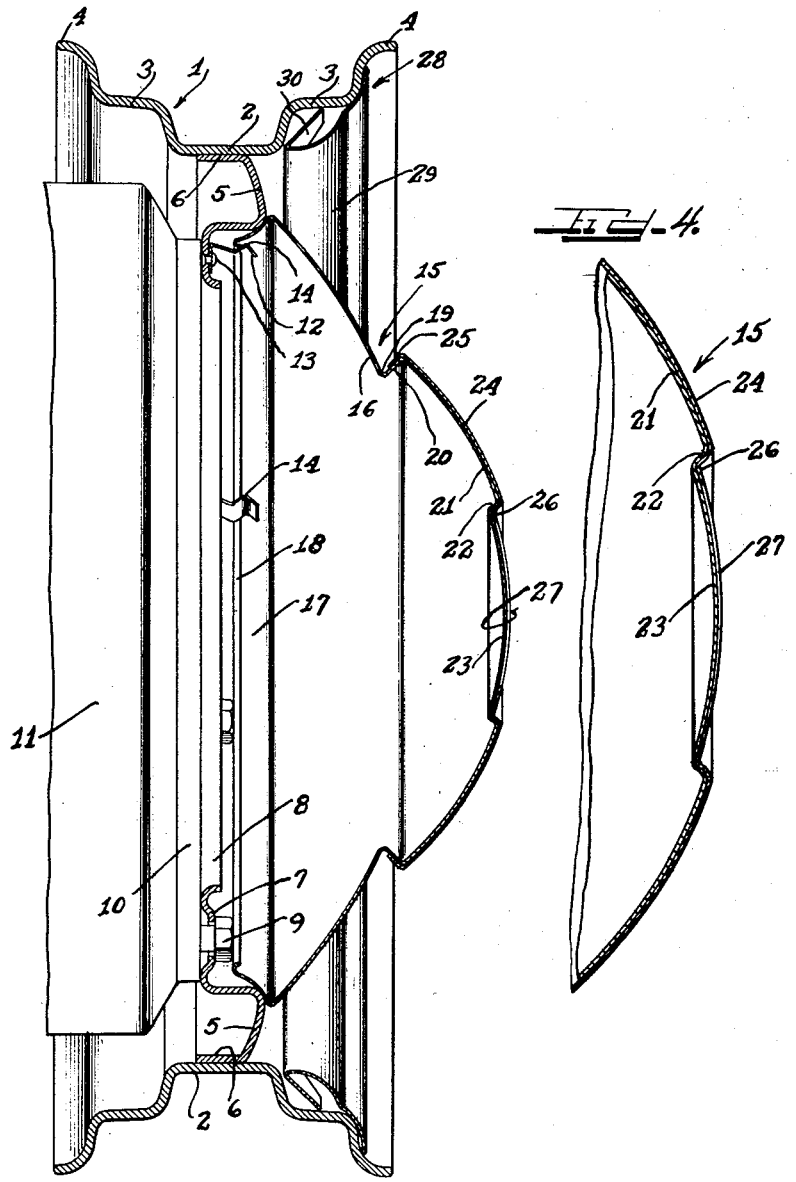
Inventor
George Albert Lyon.

Patented Mar. 1, 1938

2,109,671

UNITED STATES PATENT OFFICE 2,109,671

HUB CAP FOR WHEELS

George Albert Lyon, Allenhurst, N. J.

Application July 30, 1935, Serial No. 33,894

2 Claims. (Cl. 41—10)

This invention relates to improvements in a hub cap for a wheel, and more particularly to an ornamental hub cap or wheel disc structure, the cap preferably being made substantially oversize when compared to the customary hub cap so as to cover the major portion of the side surface of a vehicle wheel inside the tire rim.

More specifically, the invention relates to a wheel disc or hub cap which may be handled as one piece, readily snapped on or pried off a wheel, although the device may comprise a plurality of pieces joined together to form an integral structure.

It has become desirable to dress up the wheels of vehicles, especially automotive vehicles, by providing the side surface of a wheel with a two-tone color effect. In obtaining this effect, economy of construction is an essential factor. Usually, the effect is provided with the use of a hub cap or wheel disc for disposition over the side surface of the vehicle wheel. For the purpose of facility in putting the disc or hub cap structure on the wheel and taking the same off the wheel, it is desired that the structure be of only one piece. However, it is objectionably expensive and difficult to provide a two-tone color effect upon a single piece of material.

I therefore propose to provide a disc or hub cap structure made up of a plurality of pieces joined in such a manner as to provide an integral unitary structure.

Another object of the invention is to provide an ornamental disc or hub cap structure for disposition over the side surface of a vehicle wheel, which structure is formed in a simple and economical manner and provides a plurality of differently colored portions.

It is also an object of this invention to provide an ornamental disc or hub cap structure of the character set forth herein which may provide a single, two-tone or another color effect embodying more than two colors.

Also an object of this invention is the provision of an ornamental hub cap structure in which the main or body portion of the structure is formed in a single piece, and to the outer surface of which one or more pieces may readily be added and secured thereto to provide a multi-color effect.

It is also desirable in an ornamental disc or hub cap structure to provide some form of emblem, such as an emblem to designate a particular make of vehicle, and so it is another object of this invention to provide such a structure in which the emblem may be provided as an integral part of the structure in a simple and economical manner, with the emblem outstanding and attractive in character.

Another object of the invention is the provision of a disc or hub cap structure embodying an emblem as an integral part of the structure, and also including means providing a novel background to set off the emblem in a desirable manner.

In accordance with the general features of this invention, there is provided a hub cap or disc structure preferably formed of a single piece of material for disposition over the side surface of a vehicle wheel. The ornamental structure is preferably shaped for engagement with the usual spring elements attached to the hub part of a vehicle wheel. In most instances, the ornamental hub cap will be associated with a wheel having a relatively large hub opening, so that the hub cap will assume a portion of the function of an ornamental wheel disc. To this end, the hub cap is preferably provided with an outer annular portion akin to a part of a wheel disc, and the central portion is shaped in simulation of a hub cap. This central portion has attached thereto a relatively thin piece of metal which may be of different color or finish from the body of the structure. Adjacent the central portion thereof, the simulated hub cap part is indented, and across this portion the added thin piece of metal may be shaped in the manner of a stencil to provide a suitable emblem. The body of the ornamental structure in the indented region behind the emblem is preferably of a different color than the emblem so as to provide a very attractive appearance to the eye.

In another form of the structure, a background piece, preferably comprising a relatively thin metallic sheet, is inserted in the indentation in the body of the ornamental structure beneath the silhouette or stencil emblem, and this piece can be colored or finished to provide a very attractive background for the emblem.

The attachment of either of the separate thin metallic sheets to the body of the structure is preferably a substantially permanent attachment, so that these elements may not be removed except by mutilation. Accordingly, the entire ornamental hub cap construction is to all intents and purposes an integral one piece structure and may be easily snapped in position upon the wheel or just as easily pried off the wheel.

Other objects and features of this invention will more fully appear from the following detailed description, taken in conjunction with the accompanying drawings, which illustrate two embodiments of the invention, and in which:

Figure 1 is a side elevational view of a vehicle wheel, with the tire omitted, equipped with an ornamental structure embodying principles of this invention;

Figure 2 is a part sectional, part elevational view of the wheel, the wheel being partially sectioned along the line II—II of Figure 1, looking in the direction of the arrows, and showing the ornamental structure in side elevation;

Figure 3 is an enlarged, fragmentary, central vertical sectional view, with parts in elevation, of the entire wheel and ornamental structure;

Figure 4 is a further enlarged, fragmentary view of the structure shown in the right hand portion of Figure 3.

Figure 5 is a fragmentary vertical sectional view, of the same general character as Figure 4, but showing a modified form of construction.

The reference character 1 designates generally a drop-center tire rim of a vehicle wheel. This rim includes a base flange 2 disposed between opposite intermediate flanges 3—3 which terminate integrally in opposite side edges 4—4. The wheel also includes a hub or central part 5 which may be, if desired, apertured to simulate spokes and which is provided with a laterally extending flange 6 secured to the base flange 2 of the rim in any suitable manner.

The hub part 5 is also provided with a central fastening flange 7 defining a central hub opening 8. Suitable attachment means, such as the cap screws 9, extend through the fastening flange 7, and by such means the vehicle wheel may be attached to a vehicle axle part 10 associated with the usual brake drum 11 in a known manner, or the wheel may be mounted in similar fashion upon a spare wheel bracket.

The wheel is provided with a plurality, in this instance five, of hub cap retaining spring elements 12 of known construction secured to the fastening flange 7 by means of rivets 13 or in any other suitable manner. Each of these retaining springs 12, is, of course, shaped to define an outwardly projecting portion 14, behind which an inwardly sloping engaging surface is provided to retain a hub cap or the like upon the wheel.

An ornamental hub cap or disc structure embodying features of this invention, generally indicated by reference numeral 15, is shown disposed in operative position over the hub opening 8 in the vehicle wheel. This member includes a body portion 16 of one piece of relatively thin sheet material having an inwardly turned marginal portion 17 with an outwardly bent lip 18 thereupon for engagement with the hub cap retaining spring elements 12 on the wheel.

Adjacent the margin 17, the body 16 is shaped in the form of an annular outwardly arced portion terminating in an inwardly extending groove 19 defined by the annular portion and an outwardly and obliquely extending shoulder 20. The shoulder 20 merges integrally into a central dome-shaped portion 21 in simulation of a hub cap. This dome-shaped portion is centrally stepped inwardly or recessed as at 22 to provide an inner central dome-shaped part 23.

Of course, the body 16 may be given any desirable external color or finish, including the central dome-shaped portion 23, if so desired, although, in view of the shoulders at 20 and 22, it will be relatively economical to provide different colors or finishes in the outer annular portion of the body and the part 23.

To provide a decided two-tone effect in an economical manner, a member 24 of relatively thin sheet material is placed over the part 21. This member 24 has a margin 25 rolled or spun inwardly to lie intimately against the oblique shoulder 20, and another margin 26 rolled or spun inwardly to lie intimately against the outside of the shoulder 22 and the dome part 23. This element 24, being a separate piece, can easily be given any color or finish desired and readily applied to the body member 16 after each part has been finished. One example of a contrasting color effect would be to have the body portion 16 including the dome part 23 of the same color as the vehicle body and have the member 24 of a lustrous finish, such as a chrome plating finish. Of course, three colors may be provided by coloring the portion 23 different from the remainder of the body 16.

A suitable emblem or other decorative element is preferably formed integral with the member 24, and this element extends across the dome part 23, as seen best in Figure 1, in a silhouette or stencil-like manner. The emblem portion may be formed by the easy and economical operation of stamping the member 24 to cut portions of the central part therefrom leaving strips of metal defining the emblem or decoration.

The present invention may be utilized in connection with a decorative rim bead generally indicated by numeral 28, if so desired. This bead overlies a portion of the tire rim between the base flange 2 and the outer edge 4, and may be given any desirable color or finish in keeping with the appointments of the vehicle. The bead 28 is preferably a continuous ring including an outer portion 29 of any desired general configuration and an underturned portion which is toothed as indicated at 30, the series of teeth being resilient and extending obliquely towards the outer side surface of the rim. Consequently, when the ring is pushed axially inwardly into position, it is substantially impossible, without mutilation, to remove the bead from the tire rim, due to the biting engagement of the teeth 30.

In Figure 5, I have illustrated a slightly modified form of the present invention wherein the same structure is used, with the exception that between the dome part 23 in the body of the structure and the margin 26 of the decorative member 24, there is disposed a separate member 31, which member may be attached to the part 23 or held in position by the margin 26 and emblematic configuration 27 of the decorative member 24. It is a simple expedient to take the relatively thin piece of sheet material 31 and provide it with any desirable color or finish to provide substantially any desirable character of background for the emblem or decorative element 27. It is also a simple and economical expedient to place the member 31 in position and roll the margin 26 of the member 24 thereagainst.

From the foregoing, it is apparent that I have provided an ornamental hub cap or disc-like structure for attachment over the side surface of a vehicle wheel which is extremely economical to manufacture and which may be very easily snapped on or pried off a vehicle wheel. In placing the device on the wheel, it is simply necessary to push the device laterally towards the wheel until the spring elements 12 have engaged around the margin 18. It is a simple expedient also to insert a screw driver between the edge of the member and the hub part 5 of the wheel and pry the structure off the wheel. Further, the decorative structure may be handled entirely as a one piece unit, and yet is capable of providing substantially any desirable color combination, including a plurality of colors or finishes. The structure is further extremely economical to manufacture and is quite durable.

It is, of course, to be understood that while I have illustrated and described in detail a preferred form of this invention, the invention is not to be thus limited, but only insofar as defined by the scope of the appended claims.

I am aware that numerous changes may be made and many details of construction may be varied through a wide range without departing from the principles of this invention, and I, therefore, do not purpose limiting the patent granted hereon otherwise than necessitated by the prior art.

I claim as my invention:

1. The combination with a wheel including a rim part and a body part, of an ornamental member of relatively thin sheet material disposed over the side of the wheel, said member having a central portion and being provided with an annular groove formed at a reëntrant angle to said central portion, and a central decorative element disposed over said central portion and having an outer turned edge interlocked in said groove with the outer margin of said central portion.

2. In a vehicle wheel assembly, a wheel including a rim and a body part, and a decorative covering assembly for the outer side surface of the wheel including an ornamental member covering the major portion of said wheel inside the rim and having a central part thereof simulating a hub cap, and a decorative bead in contact with the wheel rim and spaced from said member to leave a narrow annular strip of the body of the wheel visible thereby providing a multi-color effect.

GEORGE ALBERT LYON.